(12) United States Patent
Crider, III et al.

(10) Patent No.: US 7,074,442 B2
(45) Date of Patent: Jul. 11, 2006

(54) GROUND MEAT PRODUCTS INCLUDING MEAT FROM SPENT EGG-LAYING HENS

(75) Inventors: William A. Crider, III, Metter, GA (US); Phil Hudspeth, Metter, GA (US); May Winston, Metter, GA (US)

(73) Assignee: Crider Poultry, Inc., Stillmore, GA (US)

( * ) Notice: Subject to any disclaimer, the term of this patent is extended or adjusted under 35 U.S.C. 154(b) by 0 days.

(21) Appl. No.: 10/833,770

(22) Filed: Apr. 28, 2004

(65) Prior Publication Data

US 2004/0202759 A1    Oct. 14, 2004

Related U.S. Application Data

(62) Division of application No. 10/230,544, filed on Aug. 29, 2002, now Pat. No. 6,737,095.

(51) Int. Cl.
*A23L 1/315*    (2006.01)

(52) U.S. Cl. .................. 426/92; 426/644; 426/646
(58) Field of Classification Search ............ 426/92, 426/644, 646
See application file for complete search history.

(56) References Cited

U.S. PATENT DOCUMENTS 3,615,584 A * 10/1971 Schlamb et al. ............ 426/284
3,917,860 A * 11/1975 Ayres et al. ................ 426/644
4,500,559 A *  2/1985 Bender et al. .............. 426/646

* cited by examiner

*Primary Examiner*—Arthur L. Corbin
(74) *Attorney, Agent, or Firm*—Troutman Sanders, LLP; Gerald R. Boss

(57) ABSTRACT

A consumable ground poultry product is obtained from spent laying hens using a mechanical deboning machine equipped with a filter and temperature and pressure controls. The leghorn is produced to have an appearance and texture similar to ground beef.

5 Claims, 3 Drawing Sheets

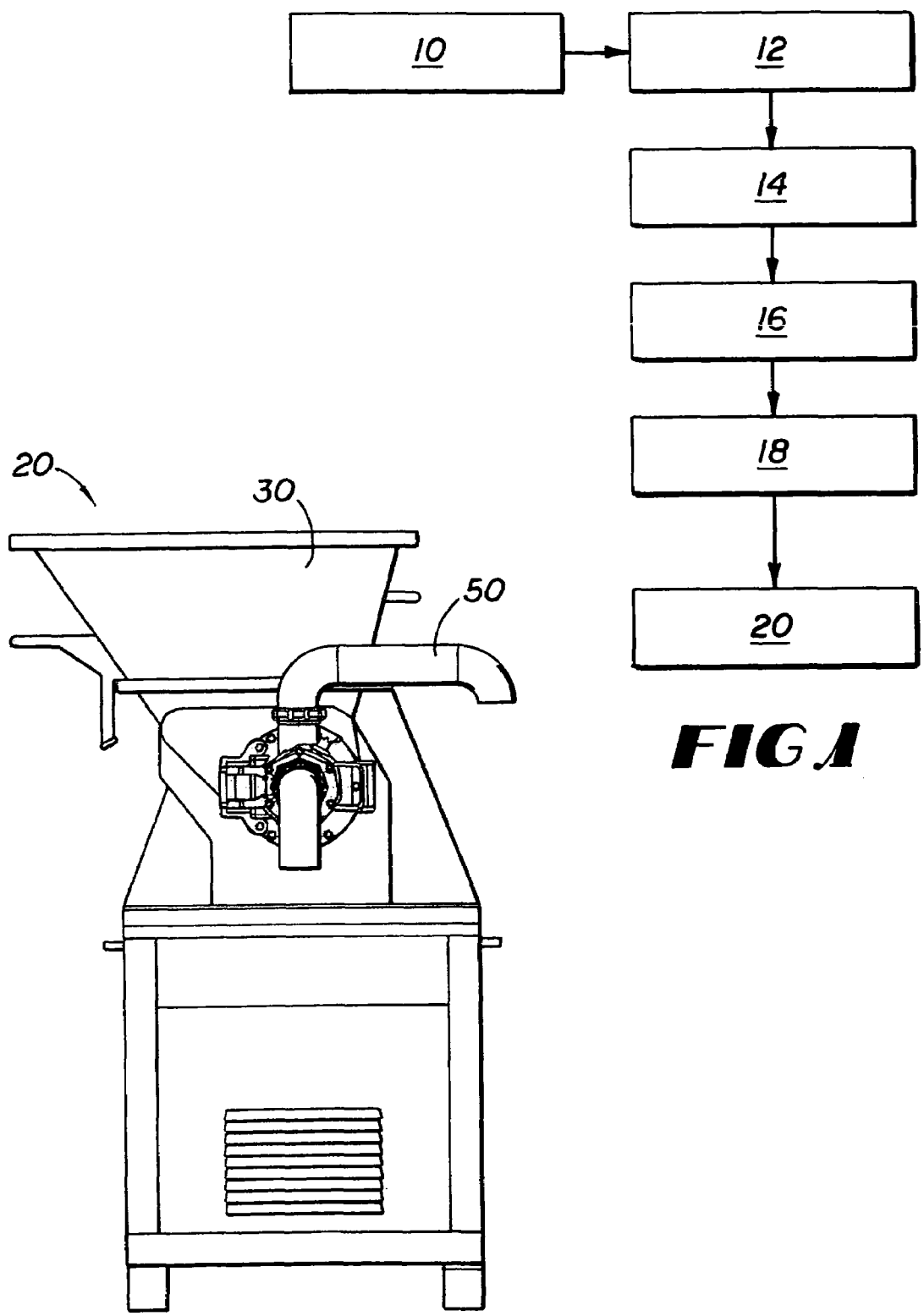

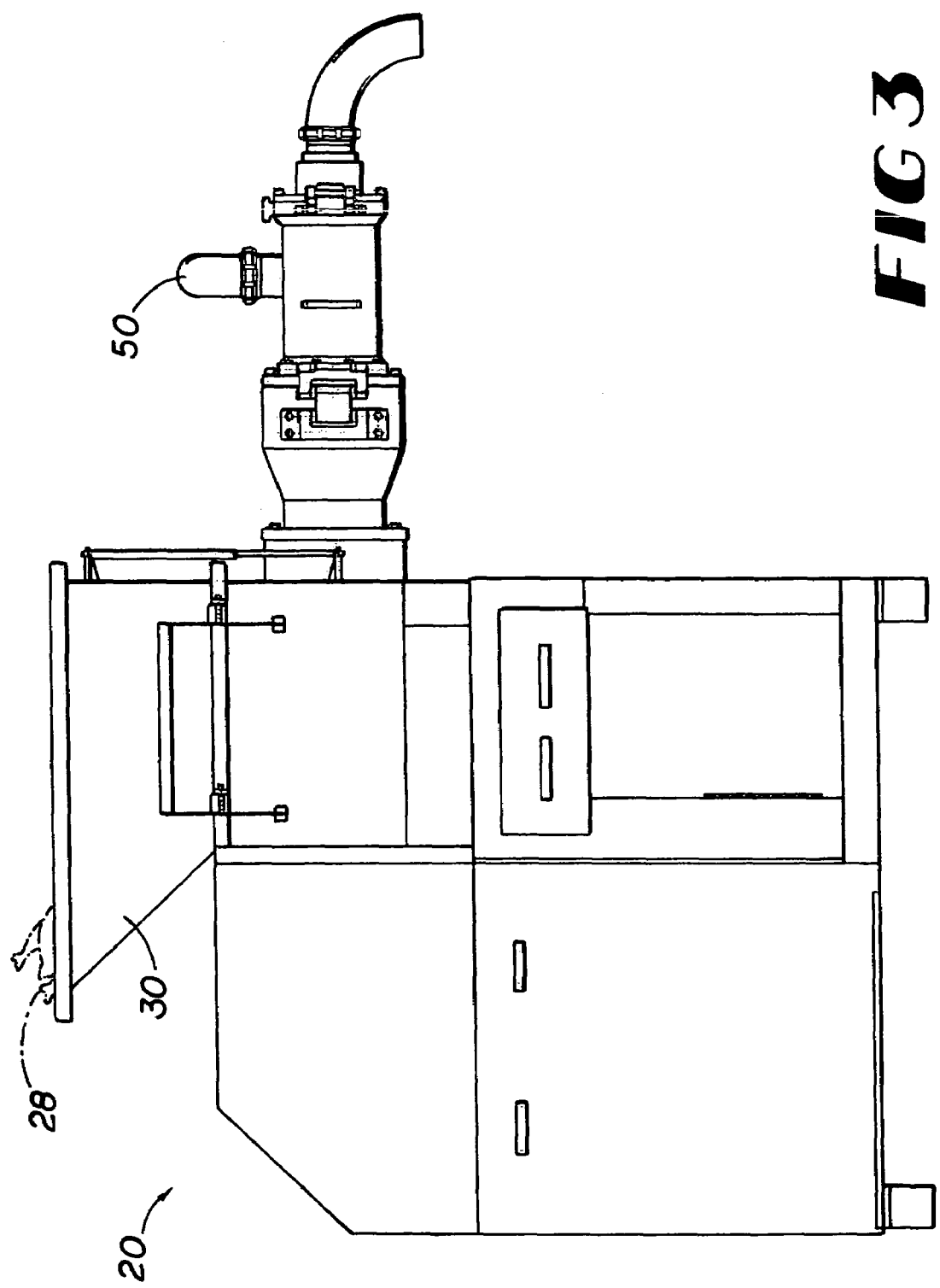

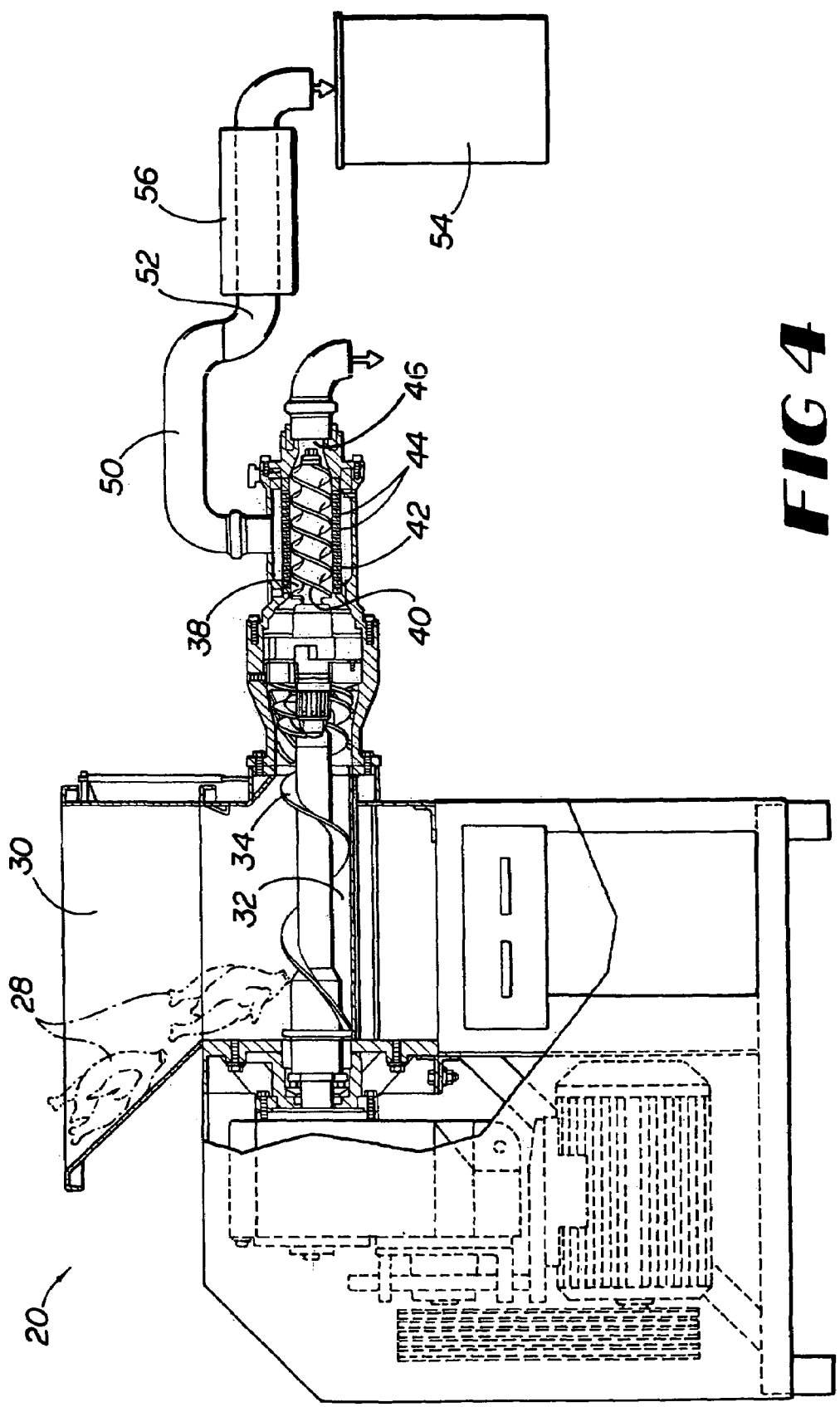

GROUND MEAT PRODUCTS INCLUDING MEAT FROM SPENT EGG-LAYING HENS

RELATED APPLICATION

This application is a divisional of U.S. patent application No. 10/230,544, filed Aug. 29, 2002 now U.S. Pat. No. 6,737,095 issuing on May 18, 2004 and entitled "PROCESS FOR PREPARING CONSUMABLE GROUND MEAT PRODUCTS FROM SPENT EGG-LAYING HENS," which is incorporated herein by reference.

FIELD OF THE INVENTION

This application involves a new use for a spent laying hen which prior to this invention was either discarded as waste, rendered for animal consumption, or limitedly utilized for pull meat. Specifically, this application is directed to a process for obtaining ground meat product for human consumption from spent egg laying hens.

The chicken industry is made up of meat production chickens and egg production chickens. These are very distinct types of chicken. The modern meat-type chicken is derived from the deep-breasted Cornish breed and has been selected with an emphasis on the production of meat rather than eggs. For meat production, the majority of the poultry market consists of broilers. Broiler chickens are genetically bred for meat consumption and are usually used for whole and cut meat products. Accordingly, through genetics these broilers have developed large breasts and have a large quantity of muscle meat. With the abundant quantity of meat existing on broilers, it is economical to process broilers through a typical processing line. A typical process involves slaughtering the chicken, defeathering the chicken, eviscerating the chicken and then separating the chicken into multiple parts. This process is labor intensive, but due to the amount and quality of meat produced is cost effective. A typical broiler chicken may produce 4.7 pounds and a typical line can run 8400 chickens per hour. The typical production costs for processing the chicken is 8 cents per pound. The current wholesale price per pound per broiler meat varies depending on the ultimate consumer product sold with a price ranging from $1.35 to $1.75 per pound of breast meat.

Egg production chickens however, constitute an entirely distinct industry from meat production chickens. Egg production chickens are primarily birds of the White Leghorn breed. The leghorns have been genetically breed for producing eggs, not meat. Consequently, these leghorns have smaller, skimpier bodies than broilers, and typically only weigh 2.3 to 3 pounds and yield very small amounts of meat. Because of the differences in body size and tissue and bone composition when compared to broilers, leghorns that are no longer useful for egg production, also referred to as "spent hens," are typically not as desirable for use as whole or cut meat products. As genetic selection for efficient egg production has progressed, the quantity of meat from a leghorn has substantially decreased. Additionally, the genetically superior egg laying hens suffer from extremely fragile bones, resulting in broken bones upon any handling of the birds. The fragility also makes processing spent hens difficult since broken bones are likely to be found in the meat yield. Accordingly, the cost of processing a spent hen far outweighs the value of the yield of meat obtained, making the process inefficient and cost prohibitive for obtaining edible poultry. Consequently, it is not feasible to process leghorns or spent hens for their meat once they have completed their use as egg layers.

One of the only alternatives for processing spent hens is through a rendering plant. This fact has been published by the Alberta Agriculture, Food and Rural Development which has published the following:

What do they do with spent layers anyway? As genetic selection for more effacing egg production progresses, meat yield of leghorn chickens has reduced substantially. Because of the high calcium requirement in producing eggshells, the laying hen has very fragile bones, which break easily during handling. Because of the low yield, and processing difficulties due to fragile bones, spent hens are of very little value to processors. Developments in poultry by-products rendering technology has allowed for larger number of birds to be rendered. Poultry Research Center News - Vol. 6 No. 1, Apr. 1997.

The problem with spent hens has also been reported by the University of Florida Department of Dairy and Poultry Sciences which has published the following:

Spent hen meat has traditionally come from leghorn chickens which are table egg layers. These birds only weight 2.5 to 3 pounds and yield very small amounts of meat, and have been traditionally used in canned soups and in some school lunch products. However, today there is a large supply of broiler breeding hens available that weigh 7 to 8 pounds each and yield significantly more meat than the leghorn layers. This has created a large volume of leghorns with no available market. The poultry industry is faced with the dilemma/challenge of finding markets for the leghorn layers. (emphasis added).

Accordingly, disposal of spent hens has also become a costly and inefficient operation for poultry farmers. Some egg producers have difficulty finding a processing plant that will take a spent flock, even with payment for disposal. Most spent hens are crated, transported to slaughter then buried or incinerated at a location remote from the production facility. The cost associated with gathering and transporting the hens is not recoverable. In addition, the issue of providing humane treatment is complicated due to the breakable, fragile bones of the leghorns, making hen disposal a potential public relations problem.

As a result of the economic, welfare and public relations issues described above, more and more egg producers are disposing of spent hens on site at the laying production facility. After slaughtering, the hens are incinerated or buried in large pits or composted. In Georgia, alligator farms have been established for disposing the spent hens. Because poultry farmers raise hundreds of thousands of birds at a time, and because the life cycle of a laying hen is only about one year, carcass disposal quickly becomes unmanageable. Land used for burial sites is quickly depleted, and the biological hazards resulting from decaying birds can create unhealthy conditions. Currently, over 100 million spent hens are disposed of each year.

This problem not only exists for commercial egg producing facilities, but also for state penitentiaries. For instance, in Georgia, the state penitentiaries raise leghorns in order to produce table eggs used in the penitentiaries. However, these penitentiaries also have the dilemma of disposing of the leghorns once their useful live as egg layers has expired. Yet, unlike the commercial egg producing companies, these state penitentiaries do not have adequate means of disposing of the leghorns i.e. they lack landfill space, don't have incinerators on site, or don't have composts on site. Consequently, these leghorns must be moved off-site for disposal. This method is not cost-effective and the costs associated with disposing the leghorns impinges on the purpose of raising the leghorns in the first place at the penitentiaries, namely to be economically self-sufficient when possible.

Alternative methods for dead bird disposal are vitally important to the poultry farmer and the environment.

Researchers are investigating processing leghorns for use in creating animal feed, pet foods and for use in zoos, and as a nitrogen source for artificial soils. However, the use of spent hens for poultry food products would be the most desirable solution, since less biological material would be buried and poultry farmers would realize an income from this current waste commodity.

One use of spent hens for food is accomplished via the use of mechanical deboning machines which results in a class of food product known as mechanically separated meat. Typically, mechanically separated poultry is produced by high pressure machinery that separates bone from skeletal muscle tissue and other edible tissue by first crushing the bone and then forcing the bone through a sieve or screen. The result is a blend of soft tissue with a paste-like consistency and cake batter form. The resulting product differs materially from other poultry products that are deboned by hand. Because of its texture and consistency, mechanically separated poultry is well-suited for use as an additive in hot dogs, bologna, nuggets, patties, sausages and lunch meat products. However, mechanically separated meat is a lower meat quality and accordingly receives a lower price in the marketplace.

While attempts in the past have been undertaken to mechanically debone leghorns this has not been done in a large scale manner. Mechanical deboning has generally been done only in a limited area as a means to identify some utilization of the leghorn meat. Processing of leghorns is not cost efficient since the costs to prepare the leghorn for rendering processing is 25 cents per pound, and the price received for mechanically separated meat is 18 cents per pound. Consequently, processing of leghorns is not actively conducted by meat producers unless subsidized either by the government or the egg-laying industry to compensate for the cost difference. The costs associated with preparing the leghorn carcass for processing is greater than the price received for the low quality mechanical separated meat product and consequently, the meat producing industry has no incentive to receive the leghorn into their processing plants.

Thus, while it is know how to process leghorns in plants, this knowledge is insufficient to establish a solution to the problem associated with the utilization of leghorns. Consequently, as both the respective agricultural departments of Alberta and University of Florida have stated the poultry industry is faced with the dilemma/challenge of finding markets for the leghorn layers. What has genetically been developed as a superior egg layer, is now primarily a bio-hazard.

Accordingly, there is a need for an economical means of disposing of spent hen/leghorns;

Thus, it is an object of the present invention to provide a method of cost-effectively processing leghorns;

It is still another object of the present invention to produce from leghorns consumable ground poultry product;

It is another object of the present invention to produce a consumable ground poultry product from spent laying hens using a mechanical de-boning machine equipped with a filter and temperature and pressure controls.

SUMMARY OF THE INVENTION

The above objectives are accomplished according to the present invention by providing a method of processing leghorns which enables the leghorns to be utilized in ready to eat markets. Briefly described, the present invention comprises a process for forming consumable ground poultry product from spent laying hens. The ground leghorn has an appearance of ground beef and a calcium content less than 0.175%. The temperature and pressure of the process is optimized to separate the bone and meat from the leghorn carcass while maintaining the texture and form of the meat to resemble ground beef.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

In the drawings:

FIG. 1 is a flow chart illustrating the present method of reclaiming a leghorn according to the present invention;

FIG. 2 represents a prospective view of a de-boning extrusion machine utilized to practice the invention;

FIG. 3 is a side view of a de-boning extrusion machine utilized to practice the invention;

FIG. 4 is cut away taken along line 4 of FIG. 3.

DETAILED DESCRIPTION OF THE INVENTION

Referring now in more detail to the drawings, the invention will be described in more detail below.

This invention covers a technique to create a highly nutritious, new and useful product from leghorns that can be used for the sole ingredient of a product or as an extender to reduce the price of other products. Leghorns, also referred to as spent laying hens, as used herein means poultry utilized for producing table eggs. The leghorn is initially slaughtered and processed through a defeathering, and evisceration process. The whole carcass is fed through an initial grinder to separate the carcass into separate smaller whole muscle components resulting from the joints being separated. The separated whole muscle components are carried through a bone separator to produce an end product that closely resembles ground beef both in appearance and texture and has a calcium content less than 0.175% and a bone content less than 1%. The leghorn is processed without excessive temperature increase which results in maintaining the integrity of the product's appearance and natural proteins. By maintaining the integrity of the product's appearance and natural proteins, several products can be made from this material as well as by simply adding the material to ground beef products as an extender to improve the product both from a texture and a taste standpoint. Examples of products that can be made from spent laying hens are as follows: taco filing, sloppy joe filling, pizza topping, breakfast patties and links, smoked sausage products, nuggets, patties and fillets, meat loafs and Salisbury steak patties, and any other type of flavored ground beef type item.

As used herein, the term "ground meat" is defined as meat manufactured from whole muscle material such as thigh, drumstick, neck, etc., with all components (skin, fat, bone, etc.) in natural proportions and the final product has a ground appearance. Ground appearance refers to product having firmness in texture and appearance, similar to the ground beef product sold in American supermarkets. This appearance includes a particle size between $\frac{1}{8}$ to $\frac{1}{32}$ in diameter.

FIG. 1 illustrates the process of the invention. A leghorn 10 is slaughtered 12, defeathered 14, eviscerated 16, and then chilled 18. This process occurs along a standard poultry processing line. Once the leghorn has been prepared, the leghorn carcass is processed through a deboning machine 20. The deboning machine 20 separates the bone content from the meat content of a leghorn carcass and processes the meat from the leghorn into strands having proportions similar to those of ground beef. The processed leghorn meat has a ground appearance and a calcium content less than 0.175% and a bone content less than 1%.

As shown in FIG. 2, in the process of the present invention, the fragile skeleton of a leghorn is mechanically deboned using deboning machine 20. The whole leghorn carcass is introduced into the deboning machine. In the preferred embodiment, deboning machine 20 is manufactured by Poss, Inc. The deboning operation occurs without excessive temperature increases, thus maintaining the integrity of the natural proteins to a greater extent than other mechanical separation processes. The resulting product is ground leghorn, having a texture and appearance similar to ground beef.

A ground leghorn product resulting from the process of the present invention had the following properties:

| NUTRIENT | AMOUNT PER 100 g | AMOUNT PER SERVING |
|---|---|---|
| Basic Components | | |
| Calories | 173.70 | 147.43 |
| Calories from Fat | 108.90 | 92.62 |
| Protein | 15.50 g | 13.18 g |
| Carbohydrates | 0.70 g | 0.60 g |
| Dietary Fiber | 0.93 g | 0.79 g |
| Sugar-Total | 0 g | 0 g |
| Fat-Total | 12.10 g | 10.29 g |
| Saturated Fat | 3.77 g | 3.21 g |
| Cholesterol | 97.77 mg | 83.15 mg |
| Water | 70.80 g | 60.22 g |
| Ash | 0.90 g | 0.77 g |
| Vitamins | | |
| Vitamin A IU | 0 IU | 0 IU |
| Thiamin-B1 | — mg | — mg |
| Riboflavin-B2 | 1.28 mg | 1.09 mg |
| Niacin-B3 | 46.10 mg | 39.21 mg |
| Vitamin-B6 | 2.04 mg | 1.74 mg |
| Vitamin C | 1.88 mg | 1.60 mg |
| Vitamin D IU | 0 IU | 0 IU |
| Vitamin E IU | 0 IU | 0 IU |
| Folate | 0.52 mcg | 0.44 mcg |
| Minerals | | |
| Calcium | 97.90 mg | 83.26 mg |
| Copper | 0.05 mg | 0.04 mg |
| Iron | 1.80 mg | 1.53 mg |
| Magnesium | 1.76 mg | 1.50 mg |
| Manganese | 0.05 mg | 0.04 mg |
| Phosphorous | 164.00 mg | 139.48 mg |
| Potassium | 192.00 mg | 163.30 mg |
| Selenium | 0.12 mcg | 0.10 mcg |
| Sodium | 66.60 mg | 56.64 mg |
| Zinc | 1.76 mg | 1.50 mg |
| Other | | |
| Caffeine | 0 mg | 0 mg |
| Sugar Alcohol | — g | — g |

Various ground leghorn product has been produced utilizing whole leghorns with wings and necks removed or with just leghorn front halves. The various ground leghorn product has had the following attributes:

Calcium content ranging from 0.07% to 0.175%;
Fat content ranging from 7–22%;
Moisture content ranging from 60–75%;
Protein content ranging from 13–20%.

Measurement of the fat, protein and calcium content of the ground chicken is conducted by methods generally known in the art. Such methods may be found in "Official Methods of Analysis of the Association of Official Analytical Chemists," 16$^{th}$ edition, 1995, which is incorporated herein by reference. The ground leghorn is low in fat, high in protein and lower in moisture than other meat sources. These characteristics make this ingredient a desirable meat from which to make a variety of products.

In addition to being used alone as a food product, the ground leghorn can also be utilized as a product extender by being added to ground beef. The following are examples of the ground leghorn being added to ground beef.

| BEEF PATTY MIX WITH CHICKEN | | | | | |
|---|---|---|---|---|---|
| Amount for 16297.2 servings | Food Item | Amount for 1 serving | Cost | ESHA Code | % Wgt |
| 1200 lb | 31.00% Fat - Beef - CUSTOM MIXED | 0.0736 lb. | — | | 59.64% |
| 65 lb. | Beef Fat - All Cuts - Raw | 0.0039 lb. | — | 8340 | 3.23% |
| 316 lb. | Chicken, Leghorns, whole w/wing, neck off | 0.0193 lb. | — | | 15.71% |
| 159 lb. | TVP - Textured Vegetable Protein ADM | 0.0097 | — | 7527 | 7.90% |
| 272 lb. | Water | 0.0166 lb. | 0 | 20041 | 13.52% |

| Nutrients per Serving | | | |
|---|---|---|---|
| Calories | 140.27 | Fat - Total | 12.70 g |
| Protein | 22.36 g | Saturated Fat | 5.17 g |
| Carbohydrates | 1.33 g | Vitamin A RE | 0 RE |
| Dietary Fiber | 0.80 g | Vitamin C | 0 mg |
| % Calories from fat | 55% | % Calories from carbs | 3% |

| Nutrient | Amount Per 100 g | Amount Per Serving |
|---|---|---|
| Basic Components | | |
| Calories | 250.48 | 140.2 |
| Calories from Fat | 204.10 | 114.2 |
| Calories from Saturated Fat | 83.03 | 46.50 |
| Protein | 39.93 g | 22.36 g |
| Carbohydrates | 2.37 g | 1.33 g |
| Dietary Fiber | 1.42 g | 0.80 g |
| Soluble Fiber | 0 g | 0 g |
| Sugar - Total | 1.11 g | 0.62 g |
| Monosaccharides | 0 g | 0 g |
| Disaccharides | 0 g | 0 g |
| Other Carbs | 0 g | 0 g |
| Fat - Total | 22.68 g | 12.70 g |
| Saturated Fat | 9.23 g | 5.17 g |
| Mono Fat | 10.35 g | 5.80 g |
| Poly Fat | 0.87 g | 0.49 g |
| Trans Fatty Acids | 0.32 g | 0.18 g |
| Cholesterol | 48.97 mg | 37.43 mg |
| Water | 57.43 g | 32.16 g |
| Vitamins | | |
| Vitamin A IU | 0 IU | 0 IU |
| A - Carotenoid | 0 RE | 0 RE |
| A - Retinol | 0 RE | 0 RE |
| A - Beta Carotene | 0 mcg | 0 mcg |
| Thiamin-B1 | 0.08 mg | 0.05 mg |
| Riboflavin-B2 | 0.15 mg | 0.08 mg |
| Niacin - B3 | 2.47 mg | 1.39 mg |
| Niacin Equiv. | 6.03 mg | 3.38 mg |
| Vitamin - B6 | 0.19 mg | 0.10 mg |
| Vitamin - B12 | 1.18 mcg | 0.66 mcg |
| Vitamin C | 0 mg | 0 mg |
| Vitamin D IU | 5.31 IU | 2.97 IU |
| Vitamin E IU | 0.86 IU | 0.48 IU |
| Folate | 27.81 mcg | 15.57 mcg |
| Panothenic Acid | 0.36 mg | 0.20 mg |

| BEEF PATTY MIX WITH CHICKEN | | |
|---|---|---|
| Minerals | | |
| Calcium | 109.05 mg | 61.07 mg |
| Copper | 0.14 mg | 0.08 mg |
| Nutrient | | |
| Magnesium | 34.28 mg | 19.19 mg |
| Manganese | 0.28 mg | 0.16 mg |
| Phosphorus | 132.73 mg | 74.33 mg |
| Potassium | 333.43 mg | 186.70 mg |
| Selenium | 4.63 mcg | 2.59 mcg |
| Sodium | 35.80 mg | 20.05 mg |
| Zinc | 2.44 mg | 1.37 mg |

| BEEF PATTY MIX WITH CHICKEN | | |
|---|---|---|
| Other Fats | | |
| Omega 3 Fatty Acids | 0.24 g | 0.14 g |
| Omega 6 Fatty Acids | 0.50 g | 0.28 g |
| Other | | |
| Alcohol | 0 g | 0 g |
| Caffeine | 0 mg | 0 mg |

| MEAT LOAF | | | | | |
|---|---|---|---|---|---|
| Amount for 16297.2 servings | Food Item | Amount for 1 serving | Cost | ESHA Code | % Wgt |
| 300 lb | 31.00% Fat - Beef - CUSTOM MIXED | 0.15284 lb | — | | 41.27% |
| 78 lb | Beef Fat - All Cuts - Raw | 0.03974 lb | — | 8340 | 10.73% |
| 94 lb | Chicken, Leghorns, whole w/wing, neck off | 0.04789 lb | — | | 12.93% |
| 102 lb | ProPlus 200FC Struct Iso Soy Protein PT | 0.05196 lb | — | 82037 | 14.03% |
| 88 lb | Pork sausage seasoning - legg | 0.04483 lb | — | | 12.10% |
| 65 lb | Water | 0.03311 lb | 0 | 20041 | 8.94% |

| Nutrients per Serving | | | |
|---|---|---|---|
| Calories | 404.25 | Fat - Total | 37.58 g |
| Protein | 54.53 g | Saturated Fat | 15.19 g |
| Carbohydrates | 3.65 g | Vitamin A RE | 29.70 RE |
| Dietary Fiber | 0.85 g | Vitamin C | 2.08 mg |
| % Calories from fat | 59% | % Calories from carbs | 3% |

| Nutrient | Amount Per 100 g | Amount Per Serving |
|---|---|---|
| Basic Components | | |
| Calories | 240.62 | 404.25 |
| Calories from Fat | 201.30 | 338.19 |
| Calories from Saturated Fat | 81.39 | 136.73 |
| Protein | 32.46 g | 54.53 g |
| Carbohydrates | 2.17 g | 3.65 g |
| Dietary Fiber | 0.51 g | 0.85 g |
| Soluble Fiber | 0 g | 0 g |
| Sugar - Total | 1.18 g | 1.98 g |
| Monosaccharides | 0 g | 0 g |
| Disaccharides | 0 g | 0 g |
| Other Carbs | 0.04 g | 0.06 g |
| Fat - Total | 22.37 g | 37.58 g |
| Saturated Fat | 9.04 g | 15.19 g |
| Mono Fat | 9.80 g | 16.46 g |
| Poly Fat | 0.90 g | 1.52 g |
| Trans Fatty Acids | 0.22 g | 0.37 g |
| Cholesterol | 42.43 mg | 71.29 mg |
| Water | 52.58 g | 88.33 g |
| Vitamins | | |
| Vitamin A IU | 600.55 IU | 1008.93 IU |
| A - Carotenoid | 0 RE | 0 RE |
| A - Retinol | 0 RE | 0 RE |
| A - Beta Carotene | 0 mcg | 0 mcg |

-continued
MEAT LOAF

|  |  |  |
|---|---|---|
| Thiamin-B1 | 0.17 mg | 0.28 mg |
| Riboflavin-B2 | 0.16 mg | 0.27 mg |
| Niacin - B3 | 3.23 mg | 5.43 mg |
| Niacin Equiv. | 5.41 mg | 9.09 mg |
| Vitamin - B6 | 0.26 mg | 0.43 mg |
| Vitamin - B12 | 1.64 mcg | 2.76 mcg |
| Vitamin C | 1.24 mg | 2.08 mg |
| Vitamin D IU | 3.67 IU | 6.17 IU |
| Vitamin E IU | 0.94 IU | 1.57 IU |
| Folate | 3.09 mcg | 5.19 mcg |
| Panothenic Acid | 0.36 mg | 0.60 mg |
| Minerals | | |
| Calcium | 97.07 mg | 163.07 mg |
| Nutrient | | |
| Iron | 1.91 mg | 3.21 mg |
| Magnesium | 6.85 mg | 11.51 mg |
| Manganese | 0.01 mg | 0.01 mg |
| Phosphorus | 85.76 mg | 144.07 mg |
| Potassium | 164.17 mg | 275.80 mg |
| Selenium | 2.33 mcg | 3.91 mcg |
| Sodium | 3517.07 mg | 5908.68 mg |
| Zinc | 3.73 mg | 6.26 mg |
| Other Fats | | |
| Omega 3 Fatty Acids | 0.26 g | 0.43 g |
| Omega 6 Fatty Acids | 0.48 g | 0.80 g |
| Other | | |
| Alcohol | 0 g | 0 g |
| Caffeine | 0 mg | 0 mg |

CHUCK WAGON

| Amount for 7364.52 servings | Food Item | Amount for 1 serving | Cost | ESHA Code | % Wgt |
|---|---|---|---|---|---|
| 650 lb | 31.00% Fat - Beef - CUSTOM MIXED | 0.0882 lb | — |  | 28.60% |
| 333 lb | Beef Fat - All Cuts - Raw | 0.0452 lb | — | 8340 | 14.65% |
| 246 lb | Chicken, Leghorns, whole w/wing, neck off | 0.033 lb | — |  | 10.82% |
| 795 lb | ProPlus 200FC Struc Iso Soy Protein PT | 0.1079 lb | — | 82037 | 34.98% |
| 50 lb | Pork Sausage seasoning-legg | 0.0067 lb | — |  | 2.20% |
| 199 lb | Water | 0.0270 lb | 0 | 20041 | 8.75% |

Nutrients per Serving

| | | | |
|---|---|---|---|
| Calories | 330.97 | Fat - Total | 29.24 g |
| Protein | 44.93 g | Saturated Fat | 11.73 g |
| Carbohydrates | 0.78 g | Vitamin A RE | 61.70 RE |
| Dietary Fiber | 0.13 g | Vitamin C | 0.54 mg |
| % Calories from fat | 59% | % Calories from carbs | 1% |

| Nutrient | Amount Per 100 g | Amount Per Serving |
|---|---|---|
| Basic Components | | |
| Calories | 236.40 | 330.9 |
| Calories from Fat | 187.94 | 263.1 |
| Calories from Saturated Fat | 75.43 | 105.6 |
| Protein | 32.09 g | 44.93 g |
| Carbohydrates | 0.56 g | 0.78 g |
| Dietary Fiber | 0.09 g | 0.13 g |
| Soluble Fiber | 0 g | 0 g |
| Sugar - Total | 0.30 g | 0.41 g |
| Monosaccharides | 0 g | 0 g |
| Disaccharides | 0 g | 0 g |
| Other Carbs | 0.09 g | 0.12 g |
| Fat - Total | 20.88 g | 29.24 g |
| Saturated Fat | 8.38 g | 11.73 g |
| Mono Fat | 9.05 g | 12.66 g |
| Poly Fat | 0.96 g | 1.35 g |
| Trans Fatty Acids | 0.15 g | 0.22 g |
| Cholesterol | 36.80 mg | 51.52 mg |
| Water | 60.75 g | 85.05 g |
| Vitamins | | |
| Vitamin A IU | 318.42 IU | 438.7 IU |
| A - Carotenoid | 0 RE | 0 RE |
| A - Retinol | 0 RE | 0 RE |
| A - Beta Carotene | 0 mcg | 0 mcg |

-continued

| | | |
|---|---|---|
| Thiamin-B1 | 0.37 mg | 0.52 mg |
| Riboflavin-B2 | 0.24 mg | 0.34 mg |
| Niacin - B3 | 5.12 mg | 7.17 mg |
| Niacin Equiv. | 7.96 mg | 11.14 mg |
| Vitamin - B6 | 0.44 mg | 0.62 mg |
| Vitamin - B12 | 2.51 mg | 3.51 mg |
| Vitamin C | 0.39 mg | 0.54 mg |
| Vitamin D IU | 2.54 mg | 3.56 mg |
| Vitamin E IU | 0.94 IU | 1.31 IU |
| Folate | 2.36 mcg | 3.30 mcg |
| Panothenic Acid | 0.64 mg | 0.89 mg |
| Minerals | | |
| Calcium | 79.27 mg | 110.9 mg |
| Nutrient | | |
| Iron | 2.41 mg | 3.37 mg |
| Magnesium | 4.99 mg | 6.99 mg |
| Manganese | 0.01 mg | 0.01 mg |
| Phosphorus | 114.84 mg | 160.7 mg |
| Potassium | 232.17 mg | 325.0 mg |
| Selenium | 1.61 mcg | 2.26 mcg |
| Sodium | 661.44 mg | 926.0 mg |
| Zinc | 6.70 mg | 9.38 m |
| Other Fats | | |
| Omega 3 Fatty Acids | 0.26 g | 0.36 g |
| Omega 6 Fatty Acids | 0.44 g | 0.61 g |
| Other | | |
| Alcohol | 0 g | 0 g |
| Caffeine | 0 mg | 0 mg |

The above tables represent food products manufactured utilizing the ground leghorns of the present invention for the Department of Corrections for the State of Georgia. The utilization of ground leghorns with ground beef enables the Department of Corrections to solve their dilemma of disposing of spent hens. By combining the ground leghorn with the ground beef, a nutritious food product is provided which is low in fat, high in protein, cheaper than a food product entirely consisting of ground beef and is also of sufficient caloric value for dietary consumption. Prior to applicant's invention, such food products were non-existent.

Referring now to FIGS. 2–24, the process will be described. Once the leghorns have been initially prepared removing the internal and external waste products leaving whole muscle meat on the carcass, the leghorn carcasses 28 are placed within hopper 30. Hopper 30 directs the leghorn carcasses into an initial separation chamber 32. Separation auger 34 is disposed within initial separation chamber 32 for separating the leghorn carcasses into individual whole muscle components. The whole muscle components are transferred via the auger to a primary extrusion chamber 38. Primary extrusion chamber 38 includes an extruding auger 40 disposed within a concentric screening filter 42. Screening filter 42 includes a plurality of apertures 44 of varying sizes including one eighth of an inch in diameter, one sixteenth of an inch in diameter and one thirty-second of an inch in diameter. The rotation of the auger carries the leghorn carcass through the extrusion chamber. Pressure is built up within the extrusion chamber forcing the whole muscle meat through the perforations of the screening filter producing ground poultry.

Such pressure progressively increases as the material travels along the length of extruding auger 40. The pressure causes fibrous bony material to mat, albeit thinly, at the inner wall of screening filter 42 and across apertures 44 before any significant quantity of the relatively soft meat material can escape, and thereby immediately commences to filter bony material from such soft meat material. The mat progressively increases in thickness along the length of the auger and is carried along by the auger to the discharge end of the separation chamber, where it is forced into and through a discharge valve 46.

The pressure within the extrusion chamber 38 is manipulated utilizing an adjusting nut. In this process, the pressure is not directly measured but is manipulated indirectly by monitoring the temperature within extruding chamber 38. The desired temperature within extrusion chamber 38 is maintained between 20° F. and 65° F. Preferably, the temperature is between 25–55° F., and most preferably between 25–30° F. By maintaining the lower temperatures, the fat and protein content of the leghorn remain intact enabling the leghorn to have a "ground" texture and appearance. The temperature may vary depending on the ultimate utilization of the ground leghorn. For example if the ground leghorn was intended to be used as patties, then the temperature would preferably be between 26–28° F., or if the ground leghorn was intended to be used for franks and bologna type products the temperature could be between 50–60 degrees F. The difference in the temperatures affect the appearance, texture and composition of the product. Consequently, when the ground leghorn will not be used as an extender or binder, it must have a more defined appearance requiring the lower temperatures. By maintaining the temperature range between 20° F. and 65° F., the integrity of the leghorn meat is able to remain intact and in passing through the sleeve apertures obtains an appearance and consistency of ground beef.

As the leghorn meat is processed through the screen apertures, the pressure of the leghorn meat builds up causing the leghorn meat to exit the extrusion chamber via leghorn meat outlet conduit 50. Leghorn meat outlet conduit 50 has an exit port communicating via a hose 52 to a receptacle 54 for collecting the ground leghorn meat. Preferably, cooling device 56, such as a water jacket, encircles leghorn meat outlet conduit 50 and preferably hose 52 as the ground meat is passed from the meat outlet conduit 50 to the receptacle.

The ground chicken produced by the process of the present invention may be used alone as a stand-alone product or with other ground meat products as an extender. Used alone, the ground chicken may be used in the same manner as hamburger. When used in conjunction with another ground meat, the ground chicken may be an extender for ground beef for use in meatloaf, taco seasoning, pizza topping, burgers, or any other ground meat product. Because of its texture and appearance, the ground chicken blends with the ground beef without sacrificing ground beef appearance.

Additionally, the ground chicken may be used as a means for adding nutrients to ground meats. By incorporating ground chicken into ground meats, the health benefits of chicken are added to the meat. For example, incorporation of chicken into ground beef results in a lower fat, lower cholesterol ground beef product. A ground meat product may be made which includes a ground beef component mixed with a ground leghorn component. The ratio between the ground beef component with the ground leghorn component may range from a 1:1 ratio to a 6:1 ratio.

Thus it may be seen that a new and useful human consumable meat product may be had utilizing spent hens according to the invention. Prior to the invention, spent hens were a bio-hazard with little or no economic value requiring the egg laying industry to incur costs to encourage others to dispose of the spent hens. With the invention, the spent hens, which heretofore were a waste product, may be utilized in a manner which produces nutritious food products of an economic value which provides incentives for the meat producing industry to undertake the spent hens into their markets. This economic incentive will assist the egg laying industry in overcoming their dilemma in disposing of the spent hens and hence prevent the further proliferation of a bio-hazard. The invention is a resolution to a long standing problem.

While the invention has been described herein in its preferred forms, it will be apparent to those skilled in the art that many modifications, additions, and deletions can be made without departing from the spirit and scope of the invention and its equivalents as set forth in the following claims.

We claim:

1. A ground meat composition comprising a ground beef and: a ground leghorn having a calcium content of less than 0.175% wherein the ratio of said ground beef to said ground leghorn ranges from 1:1 to 6:1.

2. A ground meat composition of claim 1 wherein said ground meat composition further includes a beef fat component.

3. A ground meat composition of claim 1 wherein said ground meat composition further includes a protein additive.

4. A ground meat composition of claim 1 wherein said ground meat composition further includes water.

5. A ground meat composition of claim 1 wherein said composition provides at least 200 calories per 100 grams of ground meat composition.

* * * * *